(12) United States Patent
Johann

(10) Patent No.: US 6,497,250 B1
(45) Date of Patent: Dec. 24, 2002

(54) MULTI PASSAGE VALVE

(75) Inventor: Dimeder Johann, Coldwater (CA)

(73) Assignee: Praher Canada Products Ltd., Barrie (CA)

(*) Notice: Subject to any disclaimer, the term of this patent is extended or adjusted under 35 U.S.C. 154(b) by 0 days.

(21) Appl. No.: 09/897,894

(22) Filed: Jul. 5, 2001

(51) Int. Cl.[7] .............................................. F16K 11/076
(52) U.S. Cl. .................................. 137/625.46; 251/287
(58) Field of Search ....................... 137/625.46, 625.47, 137/875, 876; 251/286, 287, 285, 284

(56) References Cited

U.S. PATENT DOCUMENTS

| | | | |
|---|---|---|---|
| 825,706 A | 7/1906 | Dyblie | |
| 1,166,571 A | 1/1916 | Bard | |
| 3,834,537 A | 9/1974 | Brett | 210/136 |
| 4,036,249 A * | 7/1977 | Perry, Sr. et al. | 137/367 |
| 4,217,933 A * | 8/1980 | Perry, Jr. et al. | 137/625.47 |
| 4,262,691 A * | 4/1981 | Kacal | 137/315 |
| 4,385,746 A * | 5/1983 | Tomlin et al. | 251/56 |
| 4,470,429 A | 9/1984 | Johnson | 137/270 |
| 4,809,949 A * | 3/1989 | Rakieski | 251/310 |
| 5,937,902 A * | 8/1999 | Ohno et al. | 137/625.43 |

* cited by examiner

Primary Examiner—John Fox
(74) Attorney, Agent, or Firm—Philip C. Mendes da Costa; Bereskin & Parr

(57) ABSTRACT

A multi-port valve has a housing, a flow plug and a stop. The housing defines a valve cavity and has at least three ports. The flow plug is positionable within the valve cavity between a first position, wherein the flow plug is adapted to prevent flow through a selected first port and a second position wherein the flow plug is adapted to prevent flow through a selected second port. The stop is attachable to the housing so that the stop extends into the cavity and is adapted to engage the flow plug to prevent the flow plug from blocking flow through a selected third port.

21 Claims, 4 Drawing Sheets

MULTI PASSAGE VALVE

FIELD OF THE INVENTION

The present invention relates to a multi-port valve, and in particular, to a multi-port valve that prevents the blockage of flow through a pre-selected port.

BACKGROUND OF THE INVENTION

In a fluid or solids pumping system, it is potentially damaging to the system if a pumping source is dead-headed, that is, if the pumping source pumps into a blind conduit or if the inlet port to the pump is closed. This situation can arise, for example, if a valve within the system is adjusted incorrectly so that the fluid flow passage into or out of the pump is blocked.

Some valves have been developed to prevent a passage from being blocked, in an effort to prevent subsequent damage to the pump or other system components caused by a blocked passage. An example of such a valve is disclosed by Johnson in U.S. Pat. No. 4,470,429. Johnson discloses a three-way valve, having an inlet port and two exit ports. A fluid flowing into the valve can be directed to exit the valve through a selected one of the exit ports by blocking off the other exit port. This is achieved by rotating a flow plug inside the valve to block the other non-selected port. The flow plug is mounted on a shaft and an engageable stop is mounted on the closure lid of the valve. As the shaft is rotated, the stop on the closure lid engages a stop member on the shaft, preventing the flow plug from being rotated into a position wherein the inlet port is blocked.

A disadvantage with Johnson is that when the valve is disassembled for maintenance, a maintenance person can inadvertently reattach the lid in the wrong orientation so that the stop member on the lid is not positioned to prevent the flow plug from blocking the inlet port.

SUMMARY OF THE INVENTION

In accordance with a first preferred embodiment, the present invention is directed to a multi-port valve, comprising a housing, a flow plug and a stop. The housing defines a valve cavity and has at least three ports. The flow plug is moveably mounted within the valve cavity between a first position wherein the flow plug prevents flow through at least a portion of a first port and a second position wherein the flow plug prevents flow through at least a portion of a second port. The stop is associated with the housing to interact with the flow plug to prevent the flow plug from blocking flow through all of the third port.

In accordance with a second preferred embodiment, the present invention also is directed to a multi-port valve comprising a housing, a flow plug and a stop. The housing defines a valve cavity and has at least three ports. The flow plug is moveably mounted within the valve cavity between a first position wherein the flow plug prevents flow through at least a portion of a first port and a second position wherein the flow plug prevents flow through at least a portion of a second port. The stop is positioned proximate a third port and has at least a portion in the cavity to interact with the flow plug to prevent the plug from blocking the third port.

In accordance with a third preferred embodiment, the present invention also is directed to a method of preventing flow blockage of a selected port in a multi-port valve. The valve comprises a housing and a flow plug. The housing defines a valve cavity and has at least three ports. The flow plug is positionable within the valve cavity between a first position wherein the flow plug is adapted to prevent flow through a first port and a second position wherein the flow plug is adapted to prevent flow through a second port. The method comprises:

attaching a stop into a third port so that the stop extends into the cavity to contact the flow plug to prevent the flow plug from blocking flow through the third port; and attaching a conduit to each of the ports.

BRIEF DESCRIPTION OF THE DRAWINGS

The present invention will now be described by way of example to the attached drawings which show a preferred embodiment of the instant invention in which.

DETAILED DESCRIPTION OF THE INVENTION

Figure 1:
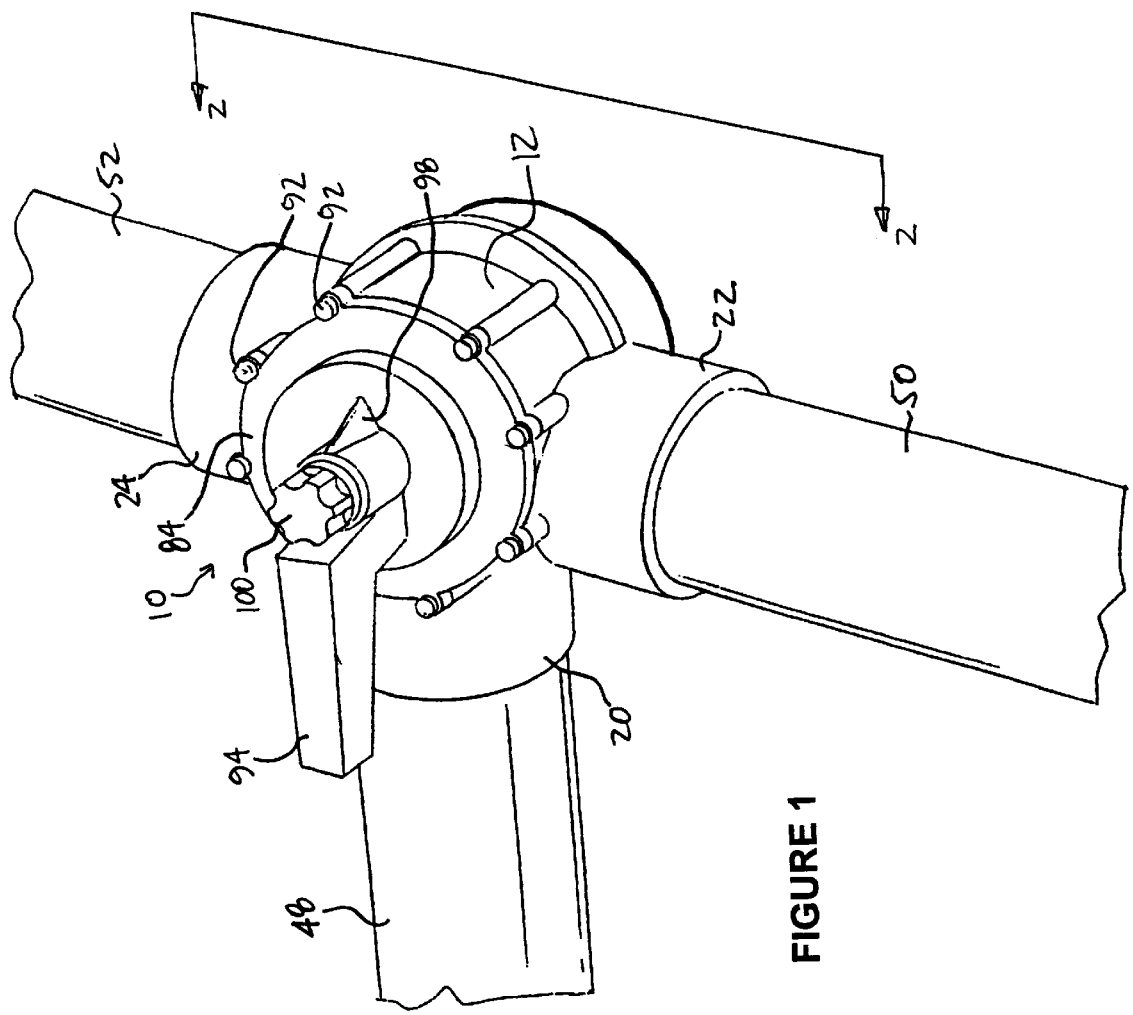
FIG. 1 is a perspective view of a valve according to the instant invention.

Reference is first made to FIG. 1 which illustrates a multi-port valve shown generally at 10, in accordance with a first preferred embodiment of the present invention. Valve 10 includes means for preventing the blockage of a selected port. In particular, this is useful to reduce the risk of dead-heading a pumping device connected to the selected port. Valve 10 permits a maintenance person to disassemble the valve for maintenance and reassemble the valve, without risk that the valve will subsequently permit the blockage of the selected port.

Figure 3:
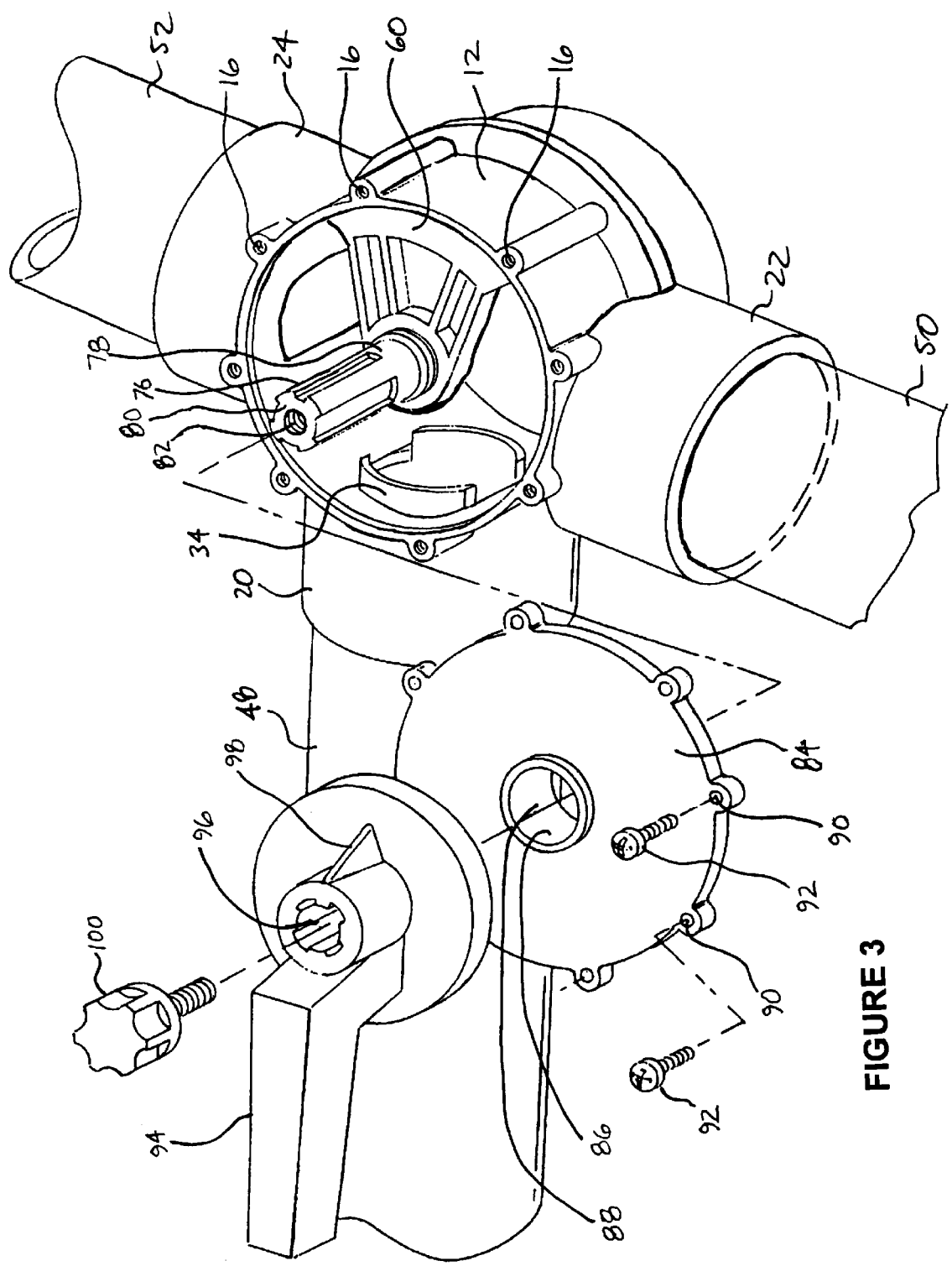
FIG. 3 is an exploded perspective view of the valve shown in FIG. 1.

Valve 10 is a multi port valve. In the figures it is shown as a three-way valve. However, it will be appreciated that valve 10 may have any number of ports 20, 22 and 24. Further, valve 10 may be of any construction known in the art which utilizes a rotary flow plug 60. In the preferred embodiment shown in the figures, valve 10 has a housing 12 which has a cylindrical interior surface 14. About the periphery of housing 12 are a plurality of threaded holes 16. For example, housing 12 can have eight threaded holes 16, as shown in FIG. 3. Preferably, holes 16 are positioned symmetrically about housing 12. It is alternatively possible, however, for holes 16 to be positioned asymmetrically.

Figure 2:
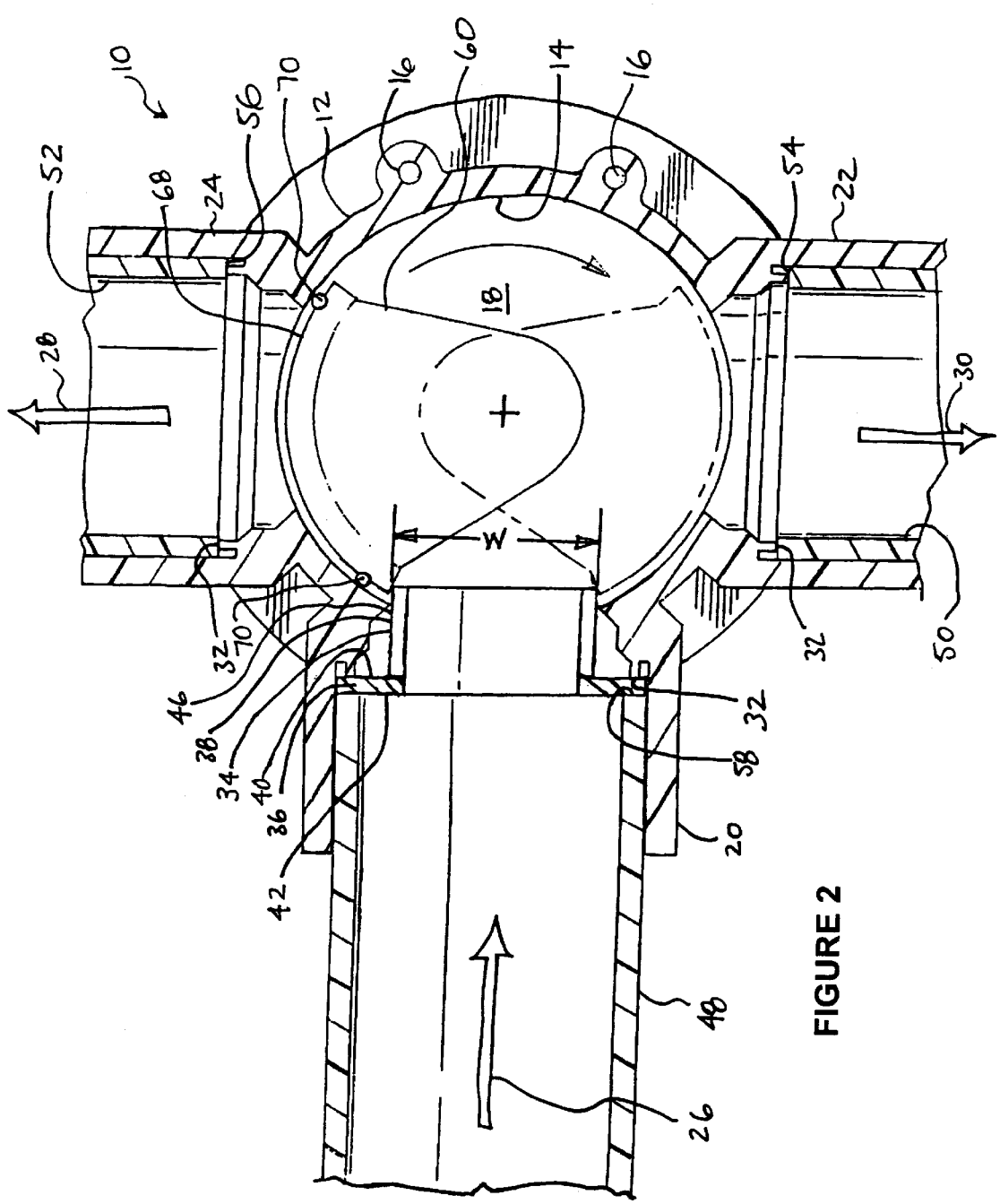
FIG. 2 is a cross-section along line 2—2 in FIG. 1 showing the interior of a valve.

Referring to FIG. 2, housing 12 defines a valve cavity 18 and has three ports 20, 22 and 24. Any of ports 20, 22 and 24 can be selected as an inlet port. For example, as shown, port 20 can be selected as the inlet port. With port 20 selected as the inlet port, direction arrows 26, 28 and 30 indicate the direction of flow of a substance through ports 20, 22 and 24. Each port includes an optional internal shoulder 32. Port 20 has a width 'W'. "Inlet" is used to define the directions of flow into valve 10. Thus, as shown in FIG. 2, port 20 is positioned upstream of valve 10 and downstream from a pump. It will be appreciated that port 20 could be positioned upstream of the valve 10 so as to be the outlet with ports 22 and 24 functioning as inlets to valve 10.

Stop 34 is associated with a port 20, 22 and 24 to interact with flow plug 60, to prevent flow plug 60 from closing off the selected port 20, 22, 24. Stop 34 may be of any construction that interacts with flow plug 60. As shown in FIG. 2, stop 34 extends outwardly from port 20 to physically engage flow plug 60 and prevent flow plug 60 from closing off port 20 (see FIGS. 2 and 4). Stop 34 may be mounted to port 20 by any means known in the art such as using an adhesive, a bayonet or threaded mount, by integrally molding it as part of housing 12, as part of conduit 48 or any other suitable attachment means which will provide sufficient rigidity to secure stop 34 in position.

Figure 4:
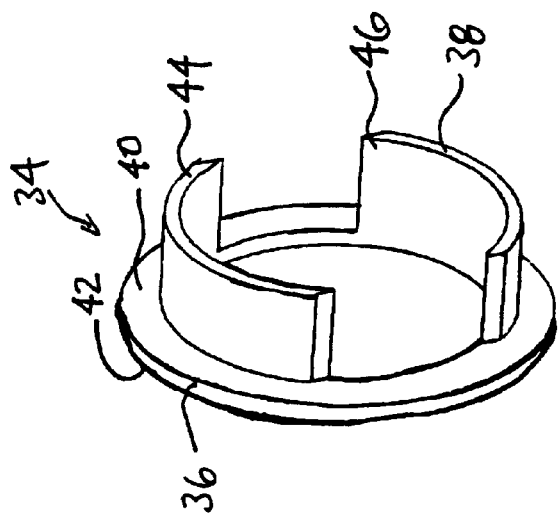
FIG. 4 is a perspective view of the stop shown in FIG. 3.

Stop 34 is configured to engage flow plug 60 to prevent flow plug 60 from fully closing port 20. Stop 34 may prevent part of port 20 from being closed and preferably prevents all of port 20 from being closed. It will be appreciated that the exact shape of stop 34 may vary depending on the shape of flow plug 60. For example, stop 34 may be one or more relatively small protrusions on inner surface 14 adjacent to port 20. Alternatively, as show in FIG. 4, it may be associated with port 20 to extend inwardly into cavity 18 from port 20. In the embodiment of FIG. 4, stop 34 includes an annular flange portion 36 and a stopper portion 38. Flange portion 36 has a front face 40 and a rear face 42. Stop 34 is positioned within port 20 so that front face 40 abuts shoulder 32 of port 20. Stopper portion 38 comprises two arms 44 and 46. Arms 44 and 46 extend into cavity 18 (see FIG. 2). Preferably, as exemplified by the embodiment of FIG. 4, stop 34 is removably associated with port 20. In this way, stop 34 may be inserted in position when valve 10 is being installed. Thus it is not necessary for an installer to mount valve 10 in a particular orientation. Instead, valve 10 may be mounted with any orientation and stopper 34 inserted once the desired orientation has been selected.

Referring to FIG. 2, ports 20, 22 and 24 are connected in flow communication with flow conduits 48, 50 and 52 respectively. Conduits 48, 50 and 52 have ends 54, 56 and 58 respectively. Ends 56 and 58 of conduits 50 and 52 abut against shoulders 32 of ports 22 and 24 respectively. End 54 of conduit 48 abuts against rear surface 42 of annular flange 38 of stop 34. Thus, stop 34 is mounted in position and can not be dislodged when lid 84 is opened to service valve 10. Conduits 48, 50 and 52 may be secured in ports 20, 22 and 24 by any means known in the art such as a bayonet or threaded mount or by an adhesive without the need for shoulders 32.

The other end of conduit 48 (not shown) can be fluidly connected to a source (not shown), such as a pump for the pumping of a substance (not shown) through valve 10. The pumped substance may be a fluid, such as water or some other liquid, air or some other gas, or alternatively the pumped substance may be any combination of a fluid and a solid, such as, for example, air mixed with a granular product. In a preferred embodiment, the valve is a valve for use with a swimming pool.

Figure 5:
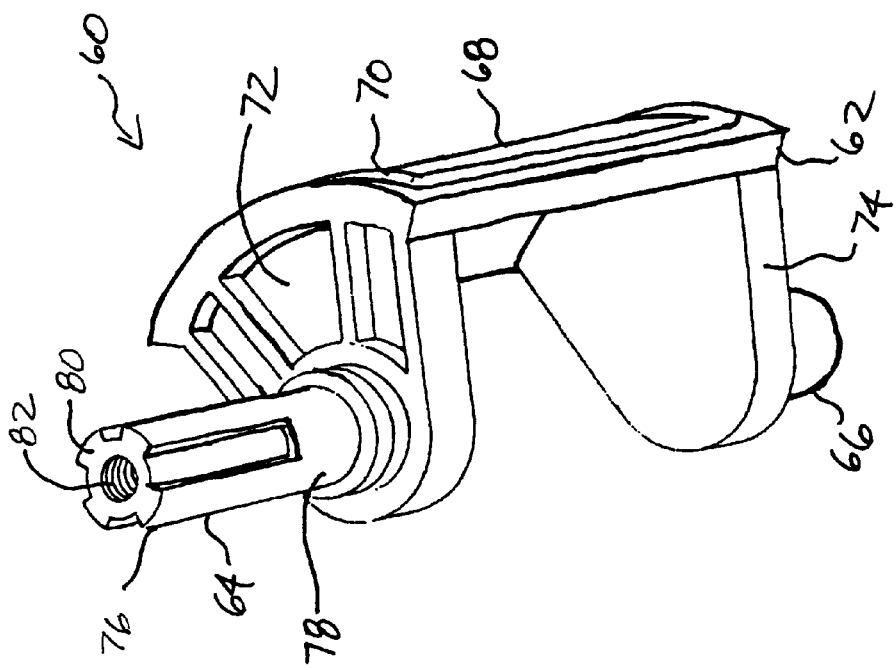
FIG. 5 is a perspective view of the flow plug shown in FIG. 3.

Flow plug 60 is rotatably mounted in cavity 18 to selectively close all or a part of a port. Flow plug 60 may be infinitely adjustable, as shown in FIG. 3, or adjustable in step-wise increments. Reference is now made to FIG. 5. Flow plug 60 includes a body 62, an upper shaft 64 and a lower shaft 66. Body 62 has a sealing face 68. Sealing face 68 defines a groove therein, in which is located a seal 70. Seal 70 mates with interior surface 14 of housing 12, (see FIG. 2), to block flow through a selected port. Alternatively, a single bearing may be used if it provides sufficient stability.

Arms 72 and 74 extend from sealing face 68 to the center of rotation of flow plug 60, and connect with upper and lower shafts 64 and 66 respectively. Lower shaft 66 fits within a recess (not shown) in housing 12, for rotation therein (see FIG. 2).

Reference is now made to FIG. 3. Upper shaft 64 extends upwards out of cavity 18. Upper shaft 64 has a splined upper portion 76, and a smooth lower portion 78. Shaft 64 ends in an end face 80, which has a threaded hole 82 therein.

A lid 84 mounts to housing 12. Lid 84 includes a smooth, cylindrical surface 86, which defines a circular hole 88 through which shaft 64 passes and for receiving lower portion 78 of shaft 64. Lid 84 also defines a plurality of peripheral holes 90, which align with holes 16 in housing 12. Fasteners 92 are used to secure lid 84 to housing 12. Other fastening means may be used but the fastening means preferably allow lid 84 to be removably mounted to housing 84. For example, lid 84 may have a threaded flange to engage a mating thread on housing 12. It will be appreciated that lid 84 may alternately be welded or glued to housing 12.

A handle 94 mounts to shaft 64 and is used for positioning flow plug 60 in cavity 18. Handle 94 has a splined hole 96 which mates with splined portion 76 of shaft 64. A position indicator 98 is included on handle 94, indicating the position of sealing face 68 of flow plug 60 inside valve cavity 18. A lock-down fastener 100 threads into threaded hole 82 in end face 80 of shaft 64, securing handle 94 to shaft 64.

Flow plug 60 is positioned in cavity 18 and is relatable therein. Flow plug 60 can be rotated to a first position, (wherein flow plug 60 is shown in solid outline in FIG. 2), wherein flow plug 60 prevents flow out of port 24. Flow plug 60 can also be rotated to a second position, (wherein flow plug 60 is shown in phantom outline in FIG. 2), wherein flow plug 60 prevents flow out of port 22. Flow plug 60 may also be positioned along the arc of inner source 14 between ports 22 and 24 such that at least part of each port and preferably all of the ports are open. Stopper portion 38 of stop 34 extends into cavity 18, to prevent flow plug 60 from rotating to a position wherein the flow is blocked through inlet port 20. This is advantageous since blocking the flow through inlet port 20 can lead to dead-heading of the pumping source.

It will be noted that, because stopper portion 38 extends substantially across the width 'W' of port 20 in the preferred embodiment, flow plug 60 cannot block any portion of port 20. In an alternate embodiment, stop 34 can have a different stopper portion that permits a partial, but not complete blockage of port 20. Another alternative stop can include a single continuous tubular arm, rather than arms 44 and 46.

Reference is made to FIG. 3. To assemble and install valve 10, a user determines which port 20, 22 or 24 is to be prevented from being blocked. Once the port is selected, for example port 20, stop 34 is inserted into inlet port 20, and is preferably affixed therein using a suitable adhesive or mechanical fastening means. In various possible orders, flow plug 60 is inserted into cavity 18. Lid 84 is attached to housing 12 using fasteners 92. Handle 94 is attached to splined portion 76 of shaft 64, and lock-down fastener 100 is threaded into hole 82 to secure handle 94 on shaft 64. Conduits 48, 50 and 52 are fitted into ports 20, 22 and 24 respectively.

During a typical inspection or maintenance task, valve 10 is opened. Thus, lock-down fastener 100 and handle 94 are removed from shaft 64. Fasteners 92 and lid 84 are removed from housing 12. Flow plug 60 may then be removed from cavity 18.

During reassembly after the inspection or maintenance is completed, flow plug 60 is re-inserted into cavity 18. Lid 84 is mounted to housing 12 using fasteners 92. Because lid 84 and housing 12 have eight symmetrical holes for example, lid 84 can be mounted to housing 12 in eight different orientations. It will be noted that lid 84 can be mounted to housing 12 in any orientation, and stop 34 will still prevent flow plug 60 from blocking inlet port 20. Thus, valve 10 prevents a maintenance worker or other person from inadvertently reassembling valve 10 in such a way that inlet port 20 can be blocked.

It is particularly advantageous for the housing 12, stop 34, lid 84, flow plug 60, handle 94, and lock-down fastener 100 to be made from a suitable plastic. However, any other suitable material of construction may alternatively be used, such as aluminum, stainless steel or other metals.

In the preferred embodiment, stop 34 is fixedly attached to the selected port, by means of, for example, an adhesive or a fastener. Alternatively, stop 34 can be inserted into the selected port by friction fit. Alternatively, stop 34 can be positioned within port 20 abutting shoulder 32 and the conduit can be inserted into the selected port behind stop 34, thus pinning stop 34 in place.

In a preferred embodiment, stop 34 is incorporated for use with three-way valve 10. Alternatively, however, stop 34 can be used with other multi-port valves having more than three ports, such as four-way valves having four ports. Further, more than one stop 34 may be included in a multi-port valve 10.

It will be appreciated that various changes and modification to valve 10 may be made and that each is within the scope of the invention.

What is claimed is:

1. A multi-port valve, comprising:
   (a) a housing, said housing defining a valve cavity and having at least three ports;
   (b) a flow plug moveably mounted within said valve cavity between a first position wherein said flow plug prevents flow through at least a portion of a first port and a second position wherein said flow plug prevents flow through at least a portion of a second port; and
   (c) a stop associated with said housing and provided wholly within the housing to interact with said flow plug to prevent said flow plug from blocking flow through all of a third port.

2. The multi-port valve as claimed in claim 1 wherein said stop extends into said cavity.

3. The multi-port valve as claimed in claim 1 wherein said stop is removably mounted in said multi-port valve.

4. The multi-port valve as claimed in claim 1 wherein said stop is associated with said third port.

5. The multi-port valve as claimed in claim 4 wherein said stop is mounted in said third port.

6. The multi-port valve as claimed in claim 4 wherein said stop extends into said cavity from said third port.

7. The multi-port valve as claimed in claim 1 wherein said stop is received in said third port and has a portion which extends into said cavity to engage said flow plug whereby said flow plug is prevented from blocking said third port.

8. The multi-port valve as claimed in claim 1, further comprising:
   a lid attachable to said housing for covering said valve cavity, said lid having a hole;
   a shaft attached to said flow plug, said shaft adapted to pass through said hole in said lid; and
   said stop is mounted to a portion of said multi-port valve other than said lid.

9. The multi-port valve as claimed in claim 1, wherein at least the third port includes an internal shoulder and said stop includes a flange portion which is configured to abut against said internal shoulder, said flange portion being adapted to permit the passage of a fluid therethrough.

10. The multi-port valve as claimed in claim 9, wherein the third port has a width and said stop includes a stopper portion, said stopper portion extending into said valve cavity for engaging with said flow plug to prevent said flow plug from blocking said selected first port.

11. The multi-port valve as claimed in claim 10, wherein said stopper portion extends substantially across the width of said port.

12. The multi-port valve as claimed in claim 9 wherein each of the ports is similarly configured so that the stop is receivable in any selected port.

13. A multi-port valve, comprising:
   (a) a housing, said housing defining a valve cavity and having at least three ports;
   (b) a flow plug moveably mounted within said valve cavity between a first position wherein said flow plug prevents flow through at least a portion of a first port and a second position wherein said flow plug prevents flow through at least a portion of a second port; and
   (c) a stop positioned proximate a third port provided wholly within the housing and having at least a portion in said cavity to interact with said flow plug to prevent said plug from blocking said third port.

14. The multi-port valve as claimed in claim 13 wherein said stop is removably mounted in said multi-port valve.

15. The multi-port valve as claimed in claim 13 wherein said stop extends into said cavity from said third port.

16. A method of preventing flow blockage of a selected port in a multi-port valve, the valve comprising a housing and a flow plug, said housing defining a valve cavity and having at least three ports, said flow plug positionable within said valve cavity between a first position wherein said flow plug is adapted to prevent flow through a first port and a second position wherein said flow plug is adapted to prevent flow through a second port, the method comprising:
   (a) attaching a stop into a third port so that said stop extends into said cavity to contact said flow plug to prevent said flow plug from blocking flow through said third port; and
   (b) attaching a conduit to each of said ports.

17. A method of preventing flow blockage of a selected port in a multi-port valve as claimed in claim 16, wherein said stop is attached to said third port by inserting said stop into said third port.

18. A multi-port valve, comprising:
   (a) a housing, said housing defining a valve cavity and having at least three ports;
   (b) a flow plug moveably mounted within said valve cavity between a first position wherein said flow plug prevents flow through at least a portion of a first port and a second position wherein said flow plug prevents flow through at least a portion of a second port; and
   (c) a stop mounted in said third port and configured to interact with said flow plug to prevent said flow plug from blocking flow through all of a third port.

19. The multi-port valve as claimed in claim 18 wherein said stop extends into said cavity from said third port.

20. The multi-port valve as claimed in claim 18 wherein said stop is received in said third port and has a portion which extends into said cavity to engage said flow plug whereby said flow plug is prevented from blocking said third port.

21. The multi-port valve as claimed in claim 18 wherein at least the third port includes an internal shoulder and said stop includes a flange portion which is configured to abut against said internal shoulder, said flange portion being adapted to permit the passage of a fluid therethrough.

* * * * *